April 6, 1954  F. A. GREENWALD  2,674,297
METHOD OF MANUFACTURING DUCTS
Filed May 6, 1949  2 Sheets-Sheet 1
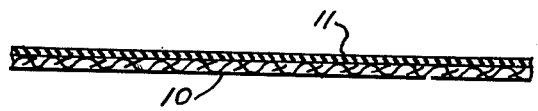
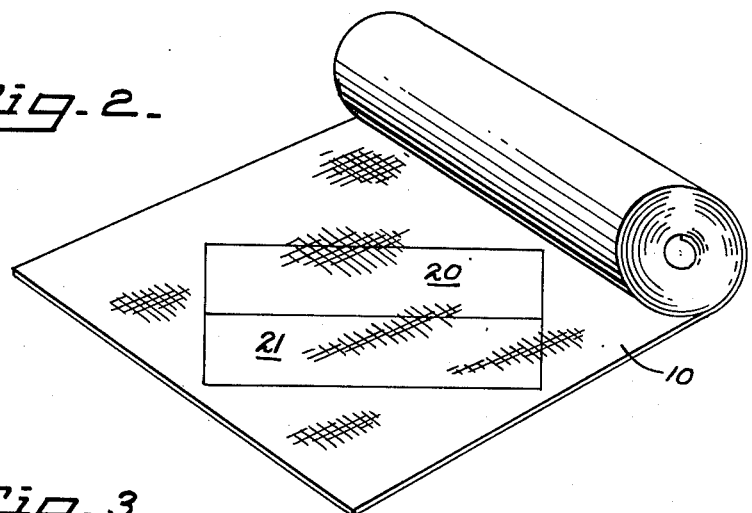
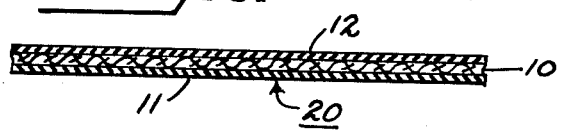
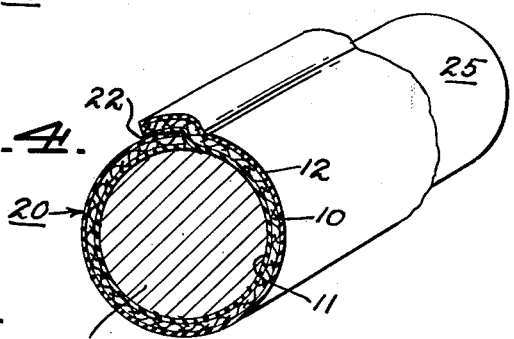
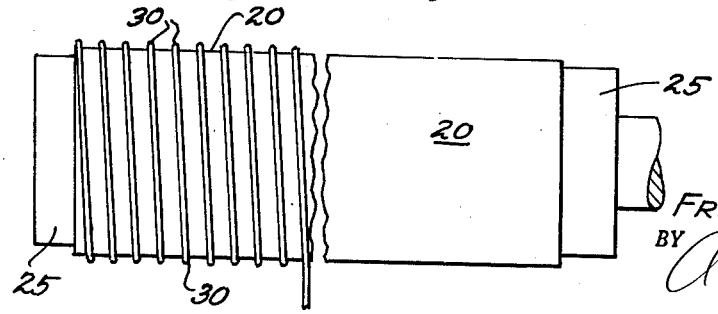
INVENTOR.
FRED A. GREENWALD
BY
ATTORNEY April 6, 1954     F. A. GREENWALD     2,674,297
METHOD OF MANUFACTURING DUCTS
Filed May 6, 1949                            2 Sheets-Sheet 2
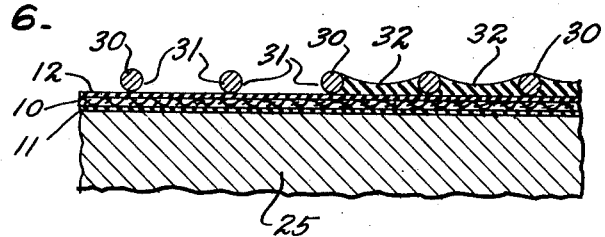
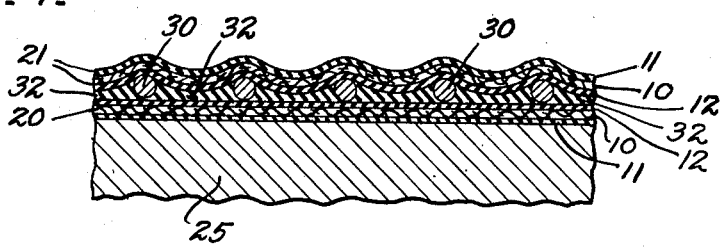
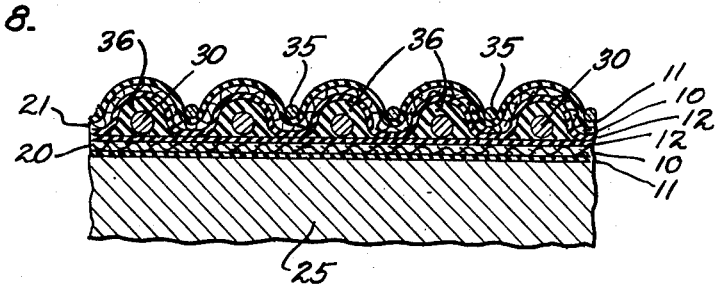
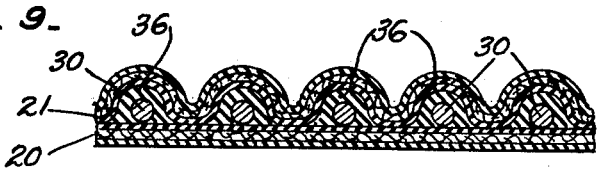
INVENTOR.
FRED A. GREENWALD
BY
ATTORNEY.

Patented Apr. 6, 1954

2,674,297

UNITED STATES PATENT OFFICE 2,674,297

METHOD OF MANUFACTURING DUCTS

Fred A. Greenwald, Southgate, Calif., assignor to Arrowhead Rubber Co., Los Angeles, Calif., a corporation of California Application May 6, 1949, Serial No. 91,689

4 Claims. (Cl. 154—8)

This invention relates to a method for manufacturing a high-temperature, wire-reinforced, flexible duct.

The invention solves many problems, and particularly those which have confronted the aircraft industry. Metal ducts have proven unsuitable because they are too heavy and too rigid, and because they must be padded all around with insulation which makes them very bulky. Rubberized cloth ducts are light and flexible, but heretofore they have not been able to withstand very high temperatures. Also, they were easily damaged if someone stepped on them or fell against them; and they tended to collapse radially and to close up or to fracture in use.

The object of this invention is to provide a novel method for manufacturing a lightweight duct, which will stand up under use in temperatures between 400° F. and 500° F.; to provide a method of manufacturing a wire-reinforced high-temperature resistant duct which is flexible and can be conformed to a convenient path; to provide a duct which can be collapsed somewhat axially but not radially; and to provide a method for making a high temperature duct that can stand abuse without fracture; to provide a duct in which the wire reinforcing is sealed into an air tight helix and is encased in a cushion stock out of contact with the fabric of the duct body. Other objects and advantages of the invention will appear from the following description.

The product produced by the method of the invention is a wire-reinforced, silicone-impregnated, woven glass fabric, gas-tight duct in which reinforcing wire is wound in a spaced apart helix in between two silicone-impregnated, woven glass fabric tubes; in which the wire itself is encased in a continuous helical cushion or mound of silicone; and in which the two woven glass fabric tubes are bonded to each other between the helical silicone cushion and to said cushion throughout its extent. The silicone coating not only seals the pores in the fabric; it also bonds the fabric layers together and provides a silicone cushion around the wire so that when the duct is bent into different shapes or is collapsed along its axis the wire will not injure or pull away from the fabric. Also should any air or gas escape through the inner fabric wall, it will not be able to escape along the wire as the wire is embraced within a silicone cushion.

The method of the invention may be briefly outlined:

(1) Two sheets of woven glass cloth are coated inside and out with silicone and the silicone is cured enough to remove its tackiness;

(2) One sheet of this coated fabric is shaped around a mandrel with an overlap;

(3) The overlap is coated with silicone cement which will bond together later when the duct is cured to completion;

(4) The reinforcing wire is laid around the tube on the mandrel in a helical form with space between each helix;

(5) Silicone paste is applied in the space between each helix and all paste is removed except that which remains after running the finger or squeegee around the tube in contact with each adjacent pair of helices;

(6) The second sheet of coated fabric is then laid around the first sheet to cover the wire and is lapped like the first sheet;

(7) A binder string or wire is then wound tightly in a helical form around the outside of the second sheet so that the binder lies in between each adjacent pair of helices; this causes almost all of the silicone paste to form into a mound around the helically wound reinforcing wire; and it brings the silicone coated fabric of the inner and outer glass cloth sheets into contact with each other in between the helical mound encasing the reinforcing wire;

(8) The duct is then cured; and (9) The binder string or wire is removed from the cured duct.

The method will now be discussed in detail, with reference to the accompanying drawings. These drawings and the following description are given in compliance with U. S. Revised Statutes, section 4888, but it is understood that these are for illustration only and that the scope of the invention is defined by the appended claims.

In the drawings:

Fig. 1 is a diagrammatic view, in section, showing a portion of a sheet of woven glass fabric with the first coating of silicone paste applied. In all of these views, the thicknesses have had to be considerably exaggerated for purposes of illustration;

Fig. 2 is a view in perspective of a partially unrolled sheet of the woven glass fabric of Fig. 1, showing how the two sheets to be used in making a section of duct are cut on the bias;

Fig. 3 is a view similar to Fig. 1, with the woven glass fabric turned upside down, showing a coating of silicone paste applied to the previously uncoated side.

Fig. 4 is a view in perspective and in section showing the forming mandrel with a sheet of woven glass fabric as in Fig. 3 wrapped around it to form the inner layer of the duct;

Fig. 5 is a view in side elevation, showing the mandrel being rotated and the helical reinforcing wire being laid around the woven glass fabric which will form the inner layer of the duct;

Fig. 6 is an enlarged view in section showing a portion of the mandrel, the inner layer of the duct, the helical reinforcing wire, and the silicone paste spread in between several of the adjacent helices of the reinforcing wire;

Fig. 7 is an enlarged view in section showing the outer layer of woven glass fabric formed over the wire and paste as applied in Fig. 6;

Fig. 8 is a view similar to Fig. 7, with the binding string or wire wound tightly around the outer layer of fabric thereby forming the silicone paste into a mound around the reinforcing wire and bringing the fabric of the outer layer into contact with the fabric of the inner layer preparatory to curing; and Fig. 9 is an enlarged view in section of a completed duct.

The materials used are woven glass fabric, silicone paste, and a reinforcing wire.

Woven glass fabric is used because it can withstand high temperatures. Silicone paste is used because of its ability to withstand high temperatures. Natural rubber and most synthetic rubbers deteriorate rapidly in the presence of heat. Silicone paste will withstand temperatures of between 400° F. and 500° F. and higher. The difficulty of handling silicone paste and the high temperatures in which the duct is used created problems the solution of which led to the method and to the novel product herein described.

The wire may be piano wire or any other type of wire preferably one having high tensile strength. The exact type of wire will depend on the use for which the duct is designed.

The first step in the method is to coat one side of a sheet of woven glass cloth 10 with silicone paste 11. (See Fig. 1.) "#120 Silastic" a silicone paste made by the Dow Corning Co. is suitable for use in making this product. The purpose of this step is to provide a light coating 11 of silicone paste on one side of the sheet 10 to seal the pores and passages between the glass threads comprising the sheet 10 and to tie these threads together so they will not fray when the sheet is cut.

The next step is to precure this coat 11 of silicone paste until it loses practically all its tackiness. A characteristic of silicone paste is its extreme tackiness when uncured. For some types of silicone paste this curing may be done by placing the coated cloth in an oven at 300° for about 3 hours.

After the coated sheet 10 is precured, two rectangular pieces 20 and 21 are cut for each duct. (See Fig. 2.) Preferably, but not necessarily, these pieces are cut on a bias, so that neither the warp nor the woof threads will lie parallel or near parallel to the axis of the tube being formed. The sheets are cut the length of the duct section to be made and are wide enough to provide a lap 22 of about an inch when each of the sheets 20 and 21 is formed into a tube. (See Fig. 4.)

The next step is to apply the coat 12 of silastic paste to the uncoated side of each sheet 20 and 21. (See Fig. 3.) Where facilities permit, the sheet 10 may receive both coats 11 and 12 at the same time and have these coats precured at the same time. For these coats the paste is spread about 0.015 inch thick. When the coat 12 is applied after the coat 11, the coat 12 on the two sheets 20 and 21 is precured about 3 hours at 300° and then they are ready to use. This second coating 12 with the coating 11 completes the sealing of all the pores in the glass fabric and provides a buffer coat or foundation coat on the surfaces of each sheet.

The next step is to wrap the sheet 20 around a cylindrical (or other shaped) mandrel 25 to form the first layer. (See Fig. 4.) This provides a coating 12 facing up and a coating 11 next to the mandrel 25. These may be reversed as coatings 11 and 12 are alike. Preferably the sheet will lap about 1 to 1½ inches at 22. The lap 22 is spread with silicone paste and when the duct is cured the lapped parts will be securely bonded together.

The next step is to lay the reinforcing wire 30 around the tube 20 on the mandrel. (See Fig. 5.) The spacing 31 between the helices is optional, but about ¼ inch is satisfactory for most purposes. When properly wound the reinforcing wire 30 will retain its helical shape without strain on the duct. If desired, an agent may be bonded to the wire 30 to facilitate its bonding to the silicone paste. If this is to be done the wire 30 must be first cleaned and then lightly coated with the agent, a varnish-like material, before it is wound around the tube 20.

The next step is to spread the silicone paste 32 around the outside of the tube 20 in the space 31 between adjacent helices of the reinforcing wire. (See Fig. 6.) One way of doing this is to run the finger or squeegee around the tube. The soft pad of the finger will ride on each adjacent pair of wires, in engagement with an adjacent pair of loops of wires, and will extend down between the wires to form a valley in the silicone paste left between them. How deep is this valley will be regulated by the amount of silicone paste that should be left there to be displaced later to form the mound of paste 36 around the reinforcing wire (see Fig. 8). If too much is left there, it will tend to be forced ahead in between the sheets 20 and 21, as the binding string 35 is wound on and when more excess has accumulated than there is space for it to flow, the binding string 35 will not be able to get to the bottom of the groove as shown in Fig. 8 so a lump of silastic paste will be left at that spot. These lumps are not desired because they interfere with the free bending and flexing of the completed duct.

The next step is to lay the sheet 21 around the tube 20, the reinforcing wire 30, and the silastic paste filler 32 between the helices. (See Fig. 7.) Preferably it is wrapped tightly and is lapped about an inch or so like the sheet 20. Silicone paste is put on the lapped parts.

The next step (see Fig. 8) is to apply the binder string or wire 35 around the outer sheet 21 so it lays evenly spaced in between the wires 30. Preferably a glass string 35 is used for this operation. The string 35 pulls the sheet 21 down into contact with the sheet 20 and pushes the silicone 32 out of the valley (Figs. 6 and 7) into spaced apart mounds 36 encasing the reinforcing wire 30. In this way the helically applied reinforcing wire 30 is encased or cushioned completely in a helical mound of silicone. Since the silicone paste 32 is forced out of the grooves 31, the surfaces of the two tubes 20 and 21 of glass fabric touch each other at 37 in the bottom of the helical grooves, and when they are cured they will be bonded together directly at those places. Elsewhere they will be bonded to the mound-like silicone helix 36. Only the top sheet 21 will be corrugated, because the inner sheet 20 was held against the smooth mandrel 25 during all the steps of manufacture.

The next step is the final curing. Preferably this is done in two stages; a setting stage of 2 to 3 hours at about 300° F., and a curing stage of 5 to 6 hours at about 460° F. The setting stage is for the purpose of letting the gases escape from the silicone paste at a temperature below curing temperature so the material will not set up and entrap the gas. As soon as the gases are off, the temperature can be raised to about 460° F. for the final cure of 5 to 6 hours.

When the curing is finished, the duct 40 is removed from the oven. After it is cool, the binding string or wire 35 is taken off, the mandrel 25 is removed, and the duct 40 is complete.

The completed duct 40 has an inner woven glass tube 20 and an outer corrugated woven glass tube 21. Both tubes are coated on each side with silastic paste. Between the two tubes 20 and 21 is the reinforcing wire 30, wound in a helix and spaced about ¼ inch between laps. The wire reinforcing 30 is inside a helical mound 36 of silicone, and this silicone mound is bonded to the inside sides 12 of the two tubes 20 and 21. In the spaces at 37 between successive laps of the silicone helix the tubes are bonded to each other. The result is there is no path open for any vapor under pressure to penetrate through the duct walls, or into the zone around the helical wire 30 to escape along the wire. The silicone 36 around the wire acts as a cushion for the wire and as a sealer to prevent air or gas from running along the wire until an opening lets it escape.

When the duct 40 is compressed or bent, the thin grooved portions are folded in, and the wire helix 30 retains its original diameter. Because the silicone helix 36 is bonded to the two tubes and because the wire is inside the silicone helix, the compression and bending will not injure or shorten the life of the duct 40, nor will it force the wire out into contact with walls 20, 21 or rip the glass cloth.

The duct 40 is exceptionally strong because it is reinforced by wire held in a silastic cushion. It can withstand high temperatures because it is made of silicone and woven glass fabric. The reinforcing wire is well insulated by the helix of silicone around it and by the two tubes. It is bendable because its outer surface is corrugated and because there are spaces between the successive laps of the reinforcing wire.

While woven fabric is referred to herein for descriptive purposes, a knit fabric or other form of flexible fabric might be used; inasmuch as the impregnating and the precuring tie the threads together and prevent unraveling.

What is claimed is:

1. A method of duct manufacture comprising coating two glass fabric sheets inside and out with silicone rubber, partially curing said sheets to remove tackiness, forming said first sheet into an inner tube, winding wire helically around said inner tube with space between each helix, applying a layer of silicone paste adjacent said wire, winding said second sheet around said wire and said inner tube to form an outer tube, deforming said outer tube between said wire to conform to the helical pattern of said wire, and bonding said inner and outer tubes together where they contact by heat-curing the silicone materials.

2. A method for the manufacture of high-heat-resistant duct from fabric layers which includes the steps of impregnating each layer of said fabric with a silicone paste and then partially curing it to remove tackiness; forming one layer of said fabric into a desired shape over a mandrel; winding a continuous reinforcing wire around said layer in spaced apart helical form; filling the space between adjacent helices with a silicone paste; forming another layer of said fabric into the same general shape as the first said layer around said first layer and over said wire, the second said layer touching said first layer except where separated by said paste and said wire; winding a continuous binding strip around said last named layer in between said wires so as to bring the inner surface of said layer down into contact in between said wires with the outer surface of the inner layer, thereby flowing said paste out of said space and into a helical mound form surrounding said reinforcing wire; and simultaneously curing said paste and completing the curing of the impregnating material in said fabric layers.

3. The method of claim 2 which includes the following step before the other layer of said fabric is formed over said wire, namely, passing a member around said wire while keeping said member in engagement with an adjacent pair of loops of wires so that it extends down into the space between said loops to form a valley in the silicone paste left between them and only leaves enough of said paste in said space to form a mound-like coating between said wire and the outer layer of said duct when said outer layer is placed around said inner layer.

4. A method for the manufacture of high-heat-resistant duct from fabric layers which includes the steps of impregnating each layer of said fabric with a silicone paste and then partially curing it to remove tackiness; forming one layer of said fabric into a desired shape over a mandrel; winding a continuous reinforcing wire around said layer in spaced apart helical form; partially filling the space between adjacent helices with a silicone paste; placing another layer of said fabric over said wire and paste and around the first said fabric layer so as to conform it generally to the same shape except as modified by the paste and wire; winding a continuous binding strip around said last named layer in between said wires so as to bring the inner surface of said layer down into contact with the outer surface of the inner layer, thereby flowing said paste out of said space and into a helical mound form surrounding said reinforcing wire; and simultaneously curing said paste and completing the curing of the impregnating material in said fabric layers.

References Cited in the file of this patent

UNITED STATES PATENTS

| Number | Name | Date |
| --- | --- | --- |
| 375,877 | Judson | Jan. 3, 1888 |
| 1,352,740 | Egerton | Sept. 14, 1920 |
| 2,168,366 | Slayter | Aug. 8, 1939 |
| 2,226,523 | Peck | Dec. 24, 1940 |
| 2,256,386 | Farrar et al. | Sept. 16, 1941 |
| 2,258,218 | Rochow | Oct. 7, 1941 |
| 2,434,465 | Marc | Jan. 13, 1948 |
| 2,525,070 | Greenwald et al. | Oct. 10, 1950 |
| 2,539,853 | Meyers et al. | Jan. 30, 1951 |

OTHER REFERENCES

Modern Plastics, vol. 22, No. 12 (Aug. 1945).